Patented Jan. 4, 1927.

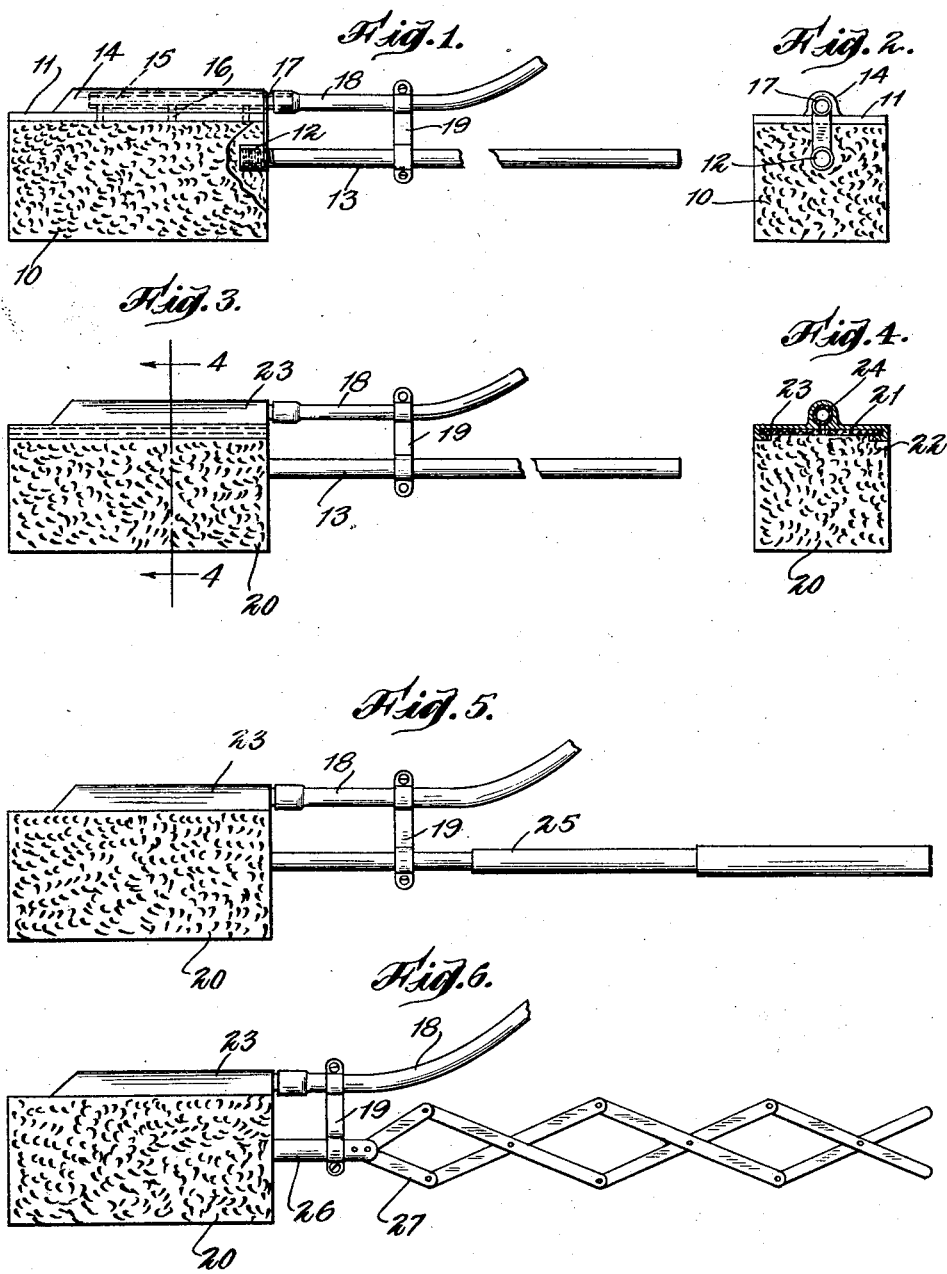

1,612,913

UNITED STATES PATENT OFFICE.

JOHN GERKEN, OF JAMAICA, NEW YORK.

AUTOMOBILE WASHING DEVICE.

Application filed March 25, 1926. Serial No. 97,269.

This invention relates to improvements in devices for washing automobiles or the like vehicles, and it is the principal object of the invention to provide a rubber-sponge or the like washing implement positively avoiding scratching of the highly polished surfaces of cars.

Another object of the invention is the provision of an automobile washing device embodying a readily exchangeable sponge equipped with means for supplying the sponge with the required quantity of water etc.

A further object of the invention is the provision of a washing device for vehicles of extremely simple and therefore inexpensive construction.

A still further object of the invention is the provision of an auto washer device having an exchangeable handle made to telescope or fold in order to save space when the device is not in use, and equipped with means to hold the water supply tube to the handle.

These and other objects and advantages of my novel and improved auto washing device will become more fully known as the description thereof proceeds, and will then be specifically defined in the appended claim.

In the accompanying drawing, forming a material part of this disclosure:

Fig. 1 is a side elevation of my improved automobile washing device constructed according to the present invention.

Fig. 2 is an end view thereof.

Fig. 3 is a side elevation of a modified form of my device.

Fig. 4 is a cross-section on line 4—4 of Figure 3.

Fig. 5 is a side elevation showing a modified form of handle.

Fig. 6 illustrates in side elevation another modified handle.

Referring to the drawing, similar reference characters on the different figures of the drawing indicate corresponding elements or features of construction herein referred to.

The rubber sponge 10 or the like washing element or member has a cover 11 integrally made therewith, and a threaded socket 12 adapted to receive the threaded end of a handle 13 made of wood or any other suitable material. Within a housing 14 longitudinally extending to and secured on the housing cover 11, a piece of pipe 15 provided with a plurality of holes 16 is embedded, having a projecting nipple 17 adapted for the attachment of a rubber or like hose 18 which can be attached to any supply of water or the like. Or, the pipe 15 may also be equipped with nipples or may just be longitudinally slotted on its inner face.

A clip 19 gripping over rubber tube and handle at suitable places is employed to keep hose and handle in their relative adjusted positions.

As shown in Figures 3 and 4, the sponge 20 has an upper cover plate 21 adapted to be endwise guided into lateral grooves formed by the side flanges 22 of a plate bearing the water supply tube 24, said plate being designated 23. The handle 13 and rubber tube 18 being attached in the same manner as described above while the clip 19 holds handle and tube connected.

In the form of the invention illustrated in Figure 5, all parts are the same as described above with the exception of the handle 25 which is made of telescoping members in any desired suitable manner, and number.

In the form of the invention illustrated in Figure 6 the handle instead of being made in one piece or in a number of telescoping pieces, has a stem 26 to the outer end of which the inner member of a lazy tongs arrangement 27 is attached, allowing a convenient handling of the washing device with a certain resiliency and elasticity giving the best of results.

The operation of my device will be entirely clear from the above description without further explanation, and it will be understood that such changes as fall within the scope of the appended claim may be made in the general arrangement of my device and in the construction of its minor details without departure from the spirit of the invention.

Having thus described my invention, what I claim as new, and desire to secure by Letters Patent is:

A vehicle washing device comprising a rubber-sponge, a cover plate therefor, a housing on said plate extending longitudinally to said sponge, a water supply pipe in said housing, means for supplying water to said pipe, a handle for the device and a clamp for keeping said handle and said water supply means in their relative positions.

In testimony whereof I affix my signature.

JOHN GERKEN.